United States Patent [19]
Seidel et al.

[11] Patent Number: 6,122,965
[45] Date of Patent: Sep. 26, 2000

[54] SYSTEM FOR THE MEASUREMENT OF ACCELERATION IN THREE AXES

[75] Inventors: Helmut Seidel, Starnberg; Josef Schalk, Altheim; Ulrich Prechtel, München, all of Germany

[73] Assignees: Temic Telefunken microelectronic GmbH; DaimlerChrysler AG, both of Germany

[21] Appl. No.: 08/980,795

[22] Filed: Dec. 1, 1997

[30] Foreign Application Priority Data

Nov. 30, 1996 [DE] Germany ............................ 196 49 715

[51] Int. Cl.$^7$ .................................................. G01P 15/00
[52] U.S. Cl. ................................. 73/514.36; 73/514.33; 73/514.32
[58] Field of Search ........................... 73/514.01, 514.16, 73/514.33, 514.36, 514.35, 514.32

[56] References Cited

U.S. PATENT DOCUMENTS

| | | | |
|---|---|---|---|
| 4,522,072 | 6/1985 | Sulouff et al. ........................... | 73/765 |
| 4,920,801 | 5/1990 | Church ................................... | 73/514.16 |
| 4,955,234 | 9/1990 | Marek .................................... | 73/514.33 |
| 5,412,987 | 5/1995 | Bergstrom et al. ................... | 73/514.33 |
| 5,614,673 | 3/1997 | Yamamoto ............................ | 73/514.33 |
| 5,723,790 | 3/1998 | Andersson ........................... | 73/514.36 |
| 5,777,227 | 7/1998 | Cho et al. ............................. | 73/514.38 |

FOREIGN PATENT DOCUMENTS

| | | |
|---|---|---|
| 3611360A1 | 10/1987 | Germany . |
| 2207758 | 2/1989 | United Kingdom . |
| 94/12886 | 6/1994 | WIPO . |

*Primary Examiner*—Richard A. Moller
*Attorney, Agent, or Firm*—Venable; George Spencer; Norman N. Kunitz

[57] ABSTRACT

A system for measuring acceleration in three axes comprises four individual sensors arranged in a rectangle on a common substrate with each having one main sensitivity axis. Each individual sensor has a seismic mass in the form of a cantilevered paddle connected by a bending beam to an outer frame and having a center of gravity. Each beam is arranged parallel to the substrate surface and each contains means for measuring the bending that occurs when acceleration forces act upon the system. The actual acceleration occurring on each axis can then be determined as a function of the error angle formed between the sensitivity axis and the normal to the substrate surface.

9 Claims, 2 Drawing Sheets

SYSTEM FOR THE MEASUREMENT OF ACCELERATION IN THREE AXES

BACKGROUND OF THE INVENTION

The invention concerns a system for measuring accelerations in three axes.

A known system for measuring accelerations in three axes is described in PCT application no. WO 94/12886. This system according to the latest technology concerns the monolithic combination of four identical sensors which are arranged at 90° to one another on a substrate. On each sensor a seismic mass is arranged on the freely-oscillating end of a cantilevered and inclined fin. The cantilevered fin has a crystallographically-determined error angle relative to the substrate surface.

Such a system has the disadvantage that the inclined fins can only be made in a double-sided and therefore very expensive etching process. Thereby a great deal of uncertainty about the thickness of the fins arises because of faulty setting of the masks necessary for etching.

SUMMARY OF THE INVENTION

The object of the invention is to provide a system for measuring accelerations in three axes in which the above-mentioned disadvantage is avoided.

According to the invention, there is a system for the measurement of accelerations which displays the following features:

a) The system consists of at least two individual sensors arranged on a common substrate each with one main sensitivity axis.

b) Each individual sensor has a cantilevered paddle, connected by a bending beam and having a centre of gravity as a seismic mass.

c) Each bending beam has a means of measuring the deflection of the seismic mass.

d) All the bending beams are arranged in parallel with the surface of the substrate.

e) Each of the main sensitivity axes of the respective individual sensors has an error angle with respect to the normal of the substrate surface.

The advantages of the invention are that due to the spatially very close arrangement of four identical sensors very good synchronization characteristics are achieved whereby drift errors of temperature and time are largely eliminated. In addition the system is built up on the basis of technology developed for a single-axis acceleration sensor so that existing manufacturing facilities and acquired specialist knowledge can continue to be used.

Thus according to the presentd invention a system for the measurement of accelerations on two axes is characterized in that an arrangement consists of two single sensors each with one main sensitivity axis and the main sensitivity axes of the two single sensors differ in their direction.

Further described is a system for the measurement of accelerations on three axes characterized in that the arrangement consists of at least three single sensors each with one respective main sensitivity axis and the main sensitivity axes of the respective single sensors differ from one another in direction in pairs and not all of them lie in one plane.

BRIEF DESCRIPTION OF THE DRAWINGS

An example of the invention is shown in detail in the drawings described below.

DESCRIPTION OF THE PREFERRED EMBODIMENTS

Figure 1:
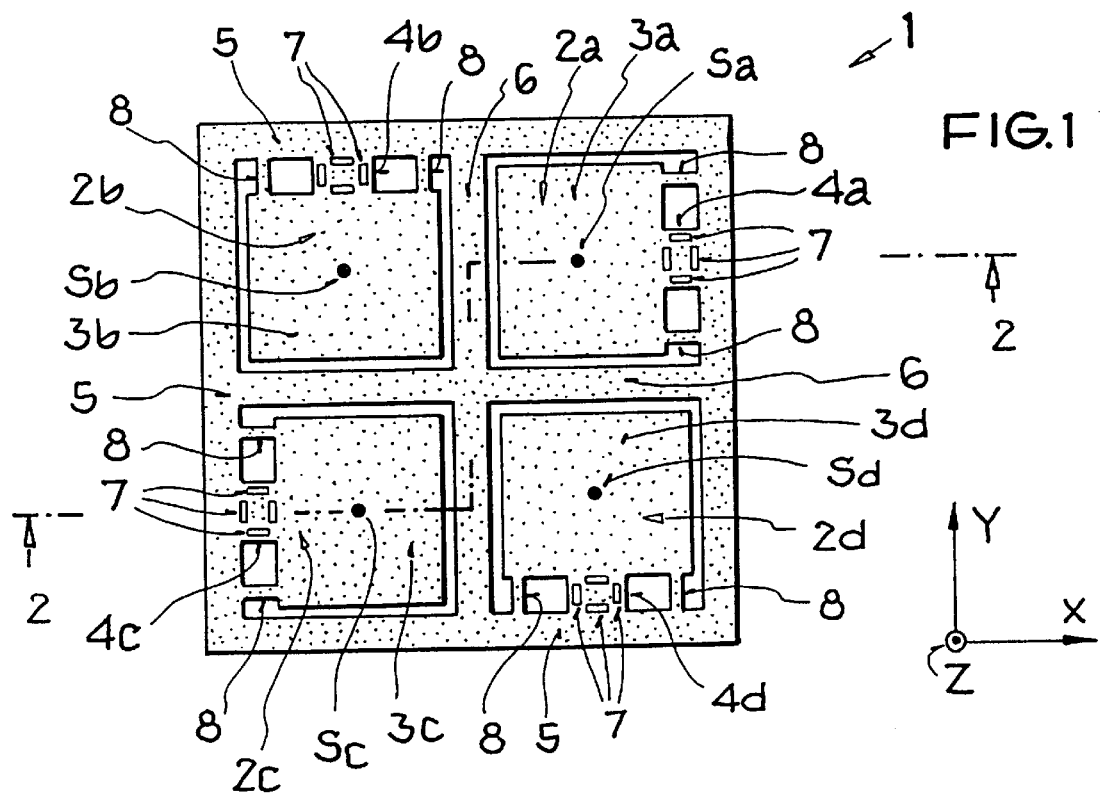
FIG. 1: A plan view of an arrangement, according to the invention, for the measuring of accelerations in three axes consisting of four identical acceleration sensors arranged on a common substrate.

FIG. 1 shows an acceleration sensor 1 for the measurement of accelerations on three axes, consisting of four identical individual sensors 2a, 2b, 2c and 2d. Each individual sensor 2a–d features a paddle 3a, 3b, 3c and 3d as a seismic mass, which is connected to an outer frame 5 by a bending beam 4a, 4b, 4c and 4d. Two side fins 8 per paddle are provided for the supplementary attachment of the paddles 3a–d to the outer frame 5 which can also be left out of the arrangement if necessary. Each paddle 3a–d has a centre of gravity $S_a$, $S_b$, $S_c$ and $S_d$.

The outer frame 5 holds together the four individual sensors 2a–d which are partitioned off by an intermediate frame 6. This intermediate frame 6 can also be dispensed with if necessary.

Each individual sensor 2a–d possesses a sensitivity in the X, Y and Z directions. Not all of the sensitivities are however required to determine the respective accelerations $a_x$, $a_y$ and $a_z$ but only the ones denoted as follows:

Sensitivity $k_z$ of all individual sensors 2a–d in the Z direction

Sensitivity $k_x$ of the individual sensors 2a and 2c in the X direction

Sensitivity $k_y$ of the individual sensors 2b and 2d in the Y direction

Figure 3:
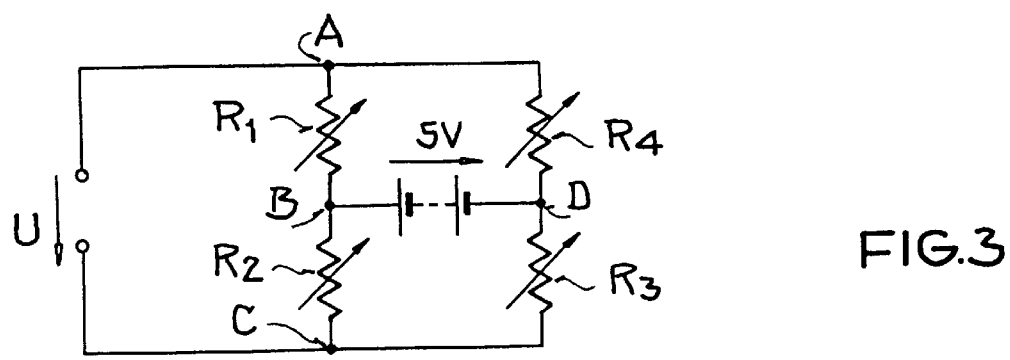
FIG. 3: An evaluation circuit for the determination of acceleration.

Transverse sensitivity $q_x$ of the individual sensors 2b and 2d in the X direction Transverse sensitivity $q_y$ of the individual sensors 2a and 2c in the Y direction On each bending beam 4a–d four piezoresistors 7 are connected to one wheatstone resistance bridge (FIG. 3). These are to measure the bending which occurs when one or more acceleration forces affect the acceleration sensor 1. The piezoresistors 7 are deformed by the bending which in turn changes their resistance value. Thereby the resistance value of the piezoresistors 7 is a criterion for the acceleration force applied to the respective bending beams 4a–d.

Figure 2:
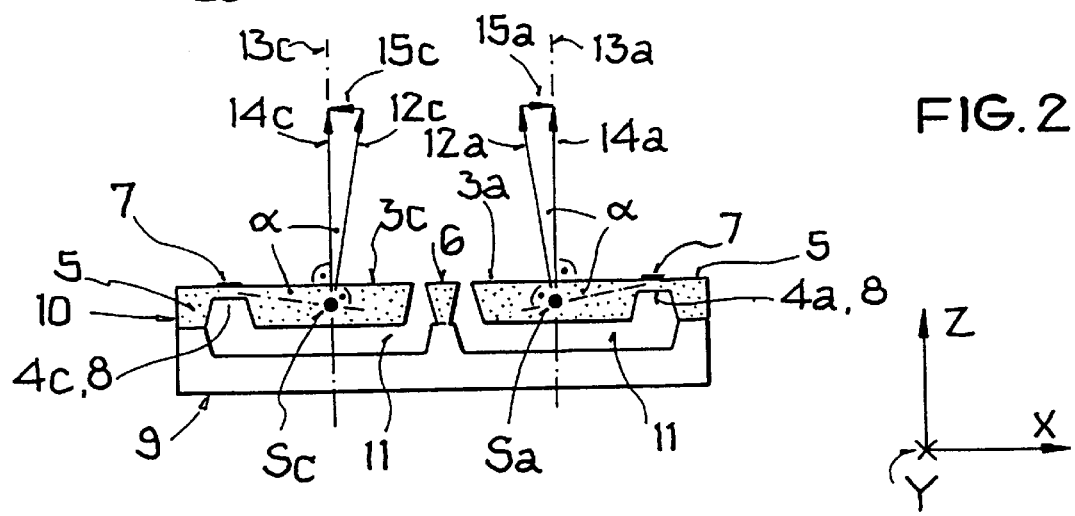
FIG. 2: A sectional drawing taken along the line 2—2 of FIG. 1.

In FIG. 2 the acceleration sensor 1 of FIG. 1 is shown in cross-section (2—2). Using wafer-bonding for example a lower covering silicon wafer 9 is connected to a structured silicon wafer 10 using a known micromechanical connecting process. Using an etching process the paddles 3a–d, the bending beams 4a–d and the side bars 8 are formed in the silicon wafer 10. Using a diffusion process the four respective piezoresistors 7 are fitted to the bending beam 4 in silicon wafer 10. The structured form of the silicon wafer 10 provides an air gap 11 between the paddles 3a–d and the covering wafer 9, so that under the effect of an acceleration force the paddles 3a–d can give way in the direction of the covering wafer 9.

Each of the paddles 3a, 3b, 3c and 3d has a main sensitivity axis 12a, 12b, 12c or 12d respectively, which passes through the respective centre of gravity $S_a$, $S_b$, $S_c$ or $S_d$, whose direction as a result of the single-ended suspension of paddles 3a–d and as a result of the cantilevered centre of mass gravity $S_a$, $S_b$, $S_c$ or $S_d$, does not run in parallel with the respective normal axes 13a, 13b, 13c or 13d.

Between the main sensitivity axes 12a–d and the respective normal axes 13a–d is a so-called error angle α, which occurs when the respective centre of gravity $S_a$, $S_b$, $S_c$ or $S_d$, is located lower in the Z direction than the respective bending beam 4a–d which forms the suspension point for the respective paddle 3a–d. Because of the identical construction the error angle α is identical for all the individual sensors 2a–d; typical values for the error angle α are between 10° and 20°. The principle can also be generalized so that the individual sensors 2a–d display different error angles.

To be able to measure accelerations in the X, Y and Z directions the main sensitivity axes 12a, 12b, 12c and 12d are split into the respective components 14a, 14b, 14c and 14d parallel to the normal axes 13a–d and into components 15a, 15b, 15c and 15d perpendicular to the normal axes 13a–d.

Because paddles 3a–d, due to the manufacturing process, basically have the same geometric dimensions, their sensitivity $k_x$ in the X direction, their sensitivity $k_y$ in the Y direction, their sensitivity $k_z$ in the Z direction, their transverse sensitivity $q_x$ in the X direction and their transverse sensitivity $q_y$ in the Y direction are also virtually the same.

FIG. 3 shows a known wheatstone bridge circuit with connection points A, B, C and D. Between connections A and B there is a changeable resistance $R_1$, between connections B and C there is a changeable resistance $R_2$, between connections C and D there is a changeable resistance $R_3$ and between connections D and A a changeable resistance $R_4$, whereby the changeable resistors $R_1$–$R_4$ consist of the four respective piezoresistors 7 (FIG. 1) on the bending beams 4a–d (FIG. 1). Connection points B and D are connected to a voltage source typically of 5 V and at connection points A and C an output voltage U is tapped off which is in effect the output voltages $u_A$, $u_B$, $u_C$ and $u_D$ of the piezoresistors 7 of the individual sensors 2a–d.

The change in resistance of the resistors $R_1$ and $R_3$ is in the opposite direction to the change in resistance of the resistors $R_2$ and $R_4$, so that in the case of an acceleration force in a given direction, for example in the Z direction, the value of resistors $R_1$ and $R_3$ reduces whilst the value of the resistors $R_2$ and $R_4$ increases.

The following equations are valid for calculation of the acceleration acting on the acceleration sensor 1 (FIG. 1) with the components $a_X$, $a_Y$, and $a_Z$ in the X, Y and Z directions:

$$a_X = \frac{1}{2 \cdot (k_x^2 + q_x^2)} \cdot [k_x \cdot (U_C - U_A) + q_x \cdot (U_D - U_B)],$$

$$a_Y = \frac{1}{2 \cdot (k_y^2 + q_y^2)} \cdot [k_y \cdot (U_D - U_B) - q_y \cdot (U_C - U_A)]$$

and $$a_Z = \frac{1}{4 \cdot k_z} \cdot (U_A + U_B + U_C + U_D),$$

where:

$a_X$=Acceleration component in the X direction
$a_Y$=Acceleration component in the Y direction
$a_Z$=Acceleration component in the Z direction
$k_X$=Sensitivity of the individual sensors 2a and 2c in the X direction
$k_Y$=Sensitivity of the individual sensors 2b and 2d in the Y direction
$k_Z$=Sensitivity of the individual sensors 2a–d in the Z direction
$q_X$=Transverse sensitivity of the individual sensors 2b and 2d in the X direction
$q_Y$=Transverse sensitivity of the individual sensors 2a and 2c in the Y direction
$U_A$=Output voltage of sensor 2a
$U_B$=Output voltage of sensor 2b
$U_C$=Output voltage of sensor 2c
$U_D$=Output voltage of sensor 2d With the same design of the individual sensors 2a–d the coefficients $k_X$ and $k_Y$ as well as $q_X$ and $q_Y$ will all be identical to one another. The output voltages $U_A$, $U_B$, $U_C$ and $U_D$ of the piezoresistors 7 of the individual sensors 2a–d are transmitted to an evaluation unit (not shown, preferably a microprocessor) which preferably has a read-only memory for the storage of sensitivity factors and in which the calculation of an acceleration with the components $a_X$, $a_Y$ and $a_Z$ takes place.

Figure 4:
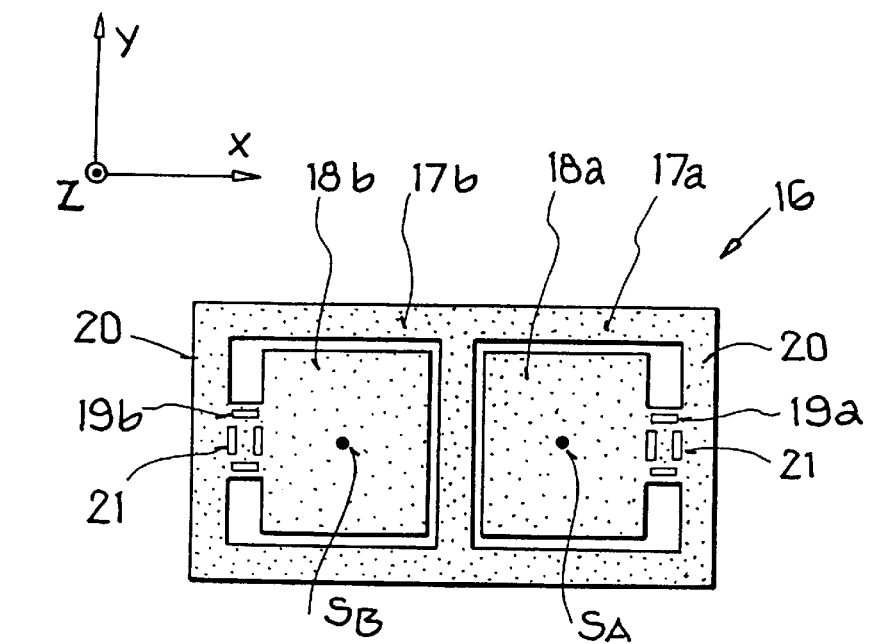
FIG. 4: A plan view of an arrangement, according to the invention, for the measuring of accelerations in two axes consisting of two identical acceleration sensors arranged on a common substrate.
Figure 5:
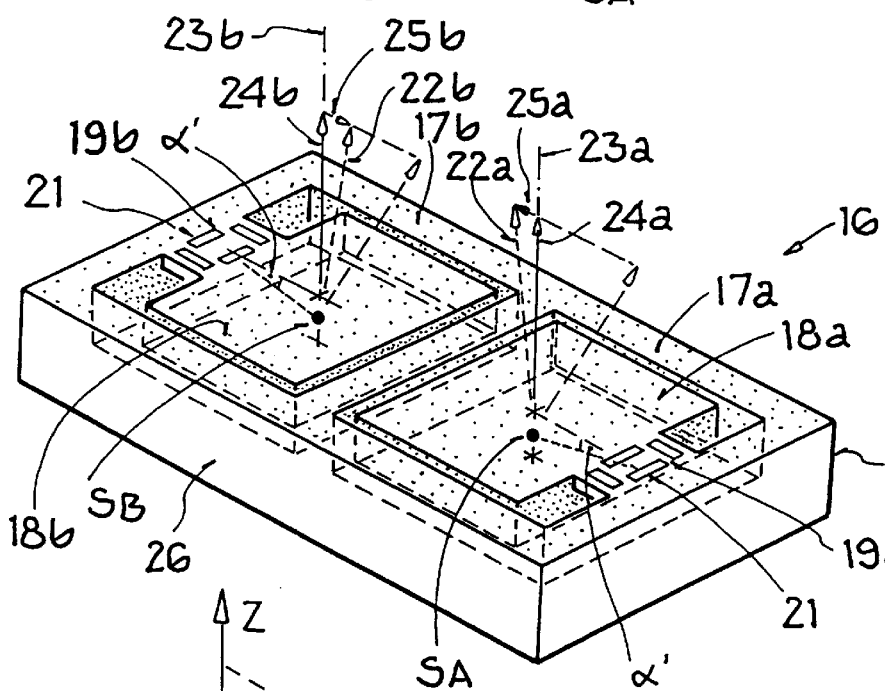
FIG. 5: A three-dimensional drawing of the arrangement according to FIG. 4.

FIGS. 4 and 5 show an acceleration measuring device 16 for the measurement of accelerations on two axes, consisting of two identical individual sensors 17a and 17b on a common substrate 26. Each individual sensor 17a and 17b has a paddle 18a and 18b as a seismic mass which is connected via a bending beam 19a and 19b to an outer frame 20. Each paddle 18a and 18b has a centre of gravity $S_A$ and $S_B$. The outer frame 20 holds together the two individual sensors 17a and 17b.

On each of the bending beams 19a and 19b are four piezoresistors 21 arranged as a wheatstone resistance bridge (FIG. 3). As already described above they are designed to measure a bending movement which occurs when one or more acceleration forces are applied to the acceleration sensor 16.

Each individual sensor 17a or 17b has a sensitivity in the X and Z directions. To determine the respective accelerations $a_X'$ and $a_Z'$ the following sensitivities are needed:

Sensitivity $k_Z'$ of the individual sensors 17a or 17b in the Z direction
Sensitivity $k_X'$ of the individual sensors 17a or 17b in the X direction Each paddle 18a and 18b has a main sensitivity axis 22a and 22b, which passes through the respective centre of gravity $s_A$ and $s_B$, whose direction as a result of the single-ended suspension of paddles 18a and 18b and as a result of the cantilevered centre of mass gravity $s_A$ and $s_B$, does not run in parallel with a respective normal axes 23a and 23b. Between the main sensitivity axes 22a, b and the respective normal axes 23a, b is, as already explained, a so-called error angle α'. Because of the identical constriction the error angle α' is identical for both the individual sensors 17a, b; typical values for the error angle α' are between 10° and 20°. The principle can also be generalized so that the individual sensors 17a, b display different error angles.

To be able to measure accelerations in the X and Z directions the main sensitivity axes 22a and 22b are split into the respective components 24a and 24b parallel to the normals 23a and 23b and into components 25a and 25b perpendicular to the normals 23a and 23b.

Because the paddles 18a and 18b, due to the manufacturing process, basically have the same geometric dimensions, their sensitivity $k_x'$ in the X direction and their sensitivity $k_z'$ in the Z direction are also virtually the same.

To calculate the acceleration acting on the acceleration sensor 16 with the components $a_x'$ and $a_z'$ in the X and Z directions the following equations are valid:

$$a_x' = \frac{1}{2 \cdot k_x'} \cdot (U_B' - U_A') \text{ and } a_z' = \frac{1}{2 \cdot k_z'} \cdot (U_A' + U_B'),$$

where:
- $a_x'$=Acceleration component in the X direction
- $a_z'$=Acceleration component in the Z direction
- $k_x'$=Sensitivity of the individual sensors 17a and 17b in the X direction
- $k_z'$=Sensitivity of the individual sensors 17a and 17b in the Z direction
- $U_A'$=Output voltage of sensor 17a
- $U_B'$=Output voltage of sensor 17b With the same design of the individual sensors 17a and 17b the coefficients $k_x'$ and $k_z'$ are identical. The output voltages $U_A'$ and $U_B'$ of the piezoresistors 21 of the individual sensors 17a and 17b are transmitted to an evaluation unit (not shown, preferably a microprocessor) which preferably has a read-only memory for the storage of sensitivity factors and in which the calculation of an acceleration with the components $a_x'$ and $a_z'$ takes place.

Apart from the piezoresistive principle described here, another principle—for example the capacitive principle, can also be used to measure the deviation of the seismic mass. This alternate principle uses capacitive tapping to measure the deflection of the seismic mass.

What is claimed is:

1. A system for the measurement of accelerations, comprising:
    a substrate, said substrate including
        a substantially rectangular frame having first, second, third and fourth sides, said first and third sides being opposite each other, and said second and fourth sides being orthogonal to said first and third sides;
        first, second, third and fourth sensors arranged in a rectangle on a surface of said substrate, each of said sensors including
            a seismic mass in the form of a paddle having a main sensitivity axis which passes through a center of gravity of said paddle and is displaced from an axis normal to a surface of said paddle by an error angle, the direction of the main sensitivity axis of the paddle of each of said first, second, third and fourth sensors extending in a different direction;
            a bending beam extending in a plane parallel to the surface of said substrate attached to said paddle and a respective side of said outer frame, the paddles of said first, second, third and fourth sensors being cantilevered from the first, second, third and fourth sides respectively of said outer frame by first, second, third and fourth bending beams; and
        means secured to the bending beam of each of said first, second, third and fourth sensors for measuring a deflection of the seismic mass attached thereto.

2. A system according to claim 1 wherein said error angle corresponds to the displacement of said seismic mass from the plane of said bending beam during acceleration of said mass.

3. A system according to claim 1 wherein said error angle is between 10 degrees and 20 degrees.

4. A system according to claim 2 wherein said error angle is between 10 degrees and 20 degrees.

5. A system according to claim 1 wherein said means secured to the bending beam of each of said four sensors comprises four piezoresistors.

6. A system according to claim 5 wherein said four piezoresistors form a Wheatstone resistance bridge.

7. A system according to claim 1 which further comprises a lower covering wafer affixed to said substrate, an air gap being provided between said lower covering wafer and each of said paddles so that when accelerated the paddles are deflected in the direction of said wafer.

8. A system according to claim 1 wherein the substrate and all components thereof are made of silicon.

9. A system according to claim 5 wherein said paddles and bending beams are formed in said substrate by an etching process, and wherein said piezoresistors are adhered to the bending beams by a diffusion process, said system being produced micromechanically.

* * * * *